(12) United States Patent
Fujii et al.

(10) Patent No.: US 6,794,260 B2
(45) Date of Patent: Sep. 21, 2004

(54) METHOD OF MANUFACTURING SOLID-STATE ELECTROLYTIC CAPACITOR

(75) Inventors: Tatsuo Fujii, Osaka (JP); Makoto Nakano, Osaka (JP); Yuji Mido, Osaka (JP); Katsumasa Miki, Osaka (JP); Suzushi Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/415,946

(22) PCT Filed: Aug. 30, 2002

(86) PCT No.: PCT/JP02/08793

§ 371 (c)(1),
(2), (4) Date: Oct. 8, 2003

(87) PCT Pub. No.: WO03/023797

PCT Pub. Date: Mar. 20, 2003

(65) Prior Publication Data

US 2004/0049899 A1 Mar. 18, 2004

(30) Foreign Application Priority Data

Sep. 10, 2001 (JP) ........................................ 2001-273126

(51) Int. Cl.⁷ .............................. H01L 21/20; H01G 9/00
(52) U.S. Cl. ........................................ 438/393; 29/25.03
(58) Field of Search .................. 438/393, 394–395, 438/381; 29/25.03

(56) References Cited

U.S. PATENT DOCUMENTS 6,464,739 B2 * 10/2002 Yoshida et al. ............ 29/25.03

FOREIGN PATENT DOCUMENTS

JP  2-137311  5/1990

* cited by examiner

Primary Examiner—Craig A. Thompson
(74) Attorney, Agent, or Firm—Wenderoth, Lind & Ponack, L.L.P.

(57) ABSTRACT

A method of manufacturing solid electrolytic capacitors that can be directly connected to semiconductor components and have a faster response to a high frequency as well as a larger capacitance includes: a dielectric forming stage where a valve metal sheet (2) is made porous and a dielectric coating (7) is provided on the porous face (3); an element forming stage where a solid electrolytic layer (8) and a collector layer (10) are formed on the dielectric coating (7); and a terminal forming stage where a connecting terminal (16) for connecting to an external electrode is formed. The element forming stage includes the steps of forming the solid electrolytic layer (8); a forming through-hole electrode (9) in a through-hole (5) that is prepared on the valve metal sheet (2); and forming the collector (10) on the solid electrolytic layer (8).

26 Claims, 8 Drawing Sheets

METHOD OF MANUFACTURING SOLID-STATE ELECTROLYTIC CAPACITOR

TECHNICAL FIELD

The present invention relates to a method of manufacturing solid electrolytic capacitors to be used in various electronic apparatuses.

BACKGROUND ART

A structure of a conventional solid electrolytic capacitor is described hereinafter with reference to its manufacturing steps. (1) Form a dielectric coating on a face of a porous section of a valve metal sheet, using one face in a thickness direction or a core of an intermediate section of the porous valve metal sheet such as aluminum or tantalum as an electrode. (2) Form a collector layer on a surface of the dielectric coating. (3) Form a capacitor element by providing an electrode layer made of metal on the collector layer. (4) Laminate the capacitor elements. (5) Gather together the electrode sections of respective capacitor elements laminated or electrode layers and couple them to an external terminal. (6) Finally, form an outer case such that the external terminal can be exposed.

The foregoing conventional solid electrolytic capacitor can increase its capacitance and reduce its equivalent series resistance (hereinafter referred to as ESR). In fact, this capacitor is mounted to a circuit board via the external terminal similar to other ordinary solid electrolytic capacitors.

The solid electrolytic capacitors, to be surface-mounted on circuit boards like semiconductor components, are obliged to have a slow response to a high frequency because the presence of terminal lengths or wire lengths increases ESR and equivalent series inductance (ESL) in an actual circuit.

In order to overcome the problem discussed above, both of an anode and a cathode are placed on a surface of a solid electrolytic capacitor so that semiconductor components can be directly mounted on the surface, and as a result, ESR and ESL can be lowered. Such a solid electrolytic capacitor discussed above is proposed.

DISCLOSURE OF THE INVENTION

The present invention aims to provide a method of manufacturing the solid electrolytic capacitors that can be directly connected to semiconductor components and have a larger capacitance as well as faster-response to a high frequency. The manufacturing method of the present invention comprises the following steps:

forming through-holes at given places after forming a resist film on a porous face of aluminum foil, one of both the foil faces having been made porous by etching; then forming insulating films on the remaining face (non-porous face, and hereinafter referred to as a flat face) and on inner walls of the through-holes; then forming a dielectric coating on the porous section after removing the resist film; and forming a solid electrolytic layer on the dielectric coating; then forming through-hole electrodes in the through-holes; and forming a collector layer on the solid electrolytic layer; then forming openings at given places of the insulating film on the flat face; and forming connecting terminals on exposed faces of the openings and the through-hole electrodes.

DESCRIPTION OF THE PREFERRED EMBODIMENTS

Figure 1:
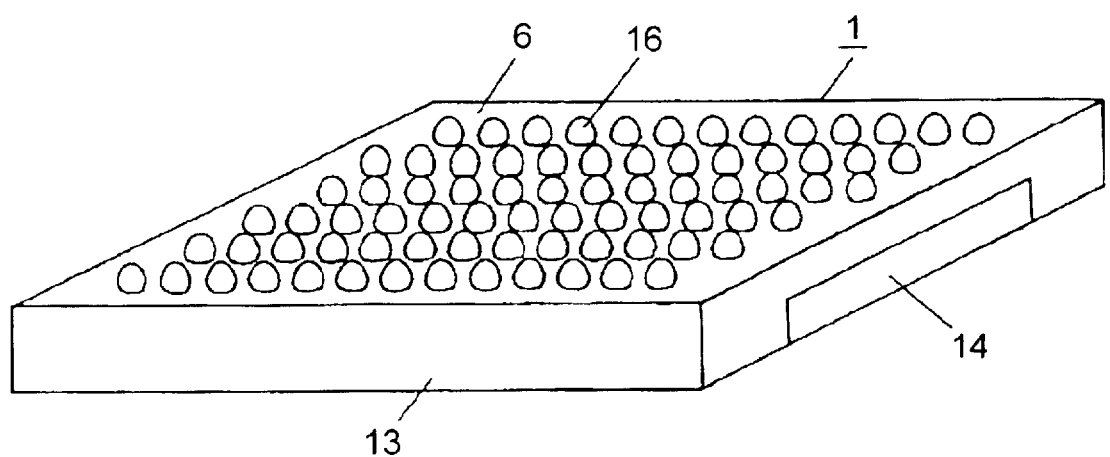
FIG. 1 shows a perspective view of a solid electrolytic capacitor of the present invention.

The manufacturing method of the present invention comprises the following steps:

forming a resist film on a porous section of aluminum foil, then forming through-holes at given places; and forming insulating films on the remaining face (non-porous face, and hereinafter referred to as a flat face) and inner walls of the through-holes; then removing the resist film; and then forming a dielectric coating on the porous section.

A set of steps hitherto discussed is referred to as a stage of forming a dielectric, and this stage is followed by the steps below:

forming a solid electrolytic layer on the dielectric coating; then forming a through-hole electrode in the through-holes; and forming a collector layer on the solid electrolytic layer.

A set of steps hitherto discussed is referred to as a stage of forming elements, and this stage is followed by the steps below:

forming openings at given places of the insulating film on the flat face of the aluminum foil; and forming connecting terminals at the openings and on the through-hole electrodes.

A set of steps hitherto discussed is referred to as a stage of forming terminals.

The present invention allows the solid electrolytic capacitors to be directly coupled to semiconductor components, and provides a manufacturing method that can manufacture with ease the solid electrolytic capacitors excellent in high frequency characteristics. A variety of combinations of steps in a middle stream of the manufacturing-flow will produce various advantages. Some of those advantages are listed below:

1. Solid electrolyte can be prevented from being formed on the flat face of the aluminum foil, so that an anode and a cathode are positively separated.
2. The through-hole electrode can be prevented from extending off the flat face of the aluminum foil, and also, the solid electrolyte can be prevented from being formed, so that the anode and the cathode are positively separated.
3. A number of openings can be formed at a time.
4. Reliability of the insulation between the through-hole electrodes and the aluminum foil can be strengthened.

A use of photosensitive resin or organic adhesive film allows forming holes at places agreeing with the through-holes by patterning, or positively prevents the resist from entering the through-holes, so that a solid electrolytic layer is formed on the dielectric coating and in the through-holes. A suitable method of forming resist film can be selected from immersion, spin-coating, screen-printing, or film-bonding, depending on the resist to be used, so that resist film can be positively formed on the insulating layer.

Photoresist is applied to both the faces before patterning, and the through-holes are formed by wet-etching, so that a number of through-holes can be formed at a time through a simple process. A suitable method of forming through-holes can be selected from laser-beam machining, punching, drilling, or electrical discharge machining, depending on a diameter and the number of the through-holes, so that the through-holes can be formed at a lower cost.

Edges of the through-holes on the porous face of the aluminum foil can be chamfered off, so that the number of occurrences of defective insulation can be reduced.

A use of an electro-deposition method for forming an insulating film allows the formation of a thin insulating film with a simple process. This electro-deposition method forms an insulating resin as the first layer, then forms the second layer made from insulating resin produced by mixing micro-gel, carbon fine particles and fine particles of titanium oxide. In other words, the first layer is thin and has a high resistivity and the second layer can substantially cover edges, so that the film is formed with a uniform thickness. As a result, the insulating film on the inner wall of the through-holes has a low defective insulation rate. After conductive adhesive is filled in the through-holes for forming the through-hole electrodes, use of a curing method can produce capacitors with a simple process and high productivity.

After a dielectric coating is formed, a resist film is formed on the entire face where an insulating film has been formed, then a solid electrolytic layer is formed on the dielectric coating before the resist film is removed. This method prevents solid electrolyte from being formed on the flat face of the aluminum foil, thereby positively separating an anode and a cathode. There is another way to separate the anode from the cathode: After a dielectric coating is formed, a resist film is formed on the entire face where an insulating film has been formed, then a through-hole electrode is formed in the through-holes before the resist film is removed. This method prevents the through-hole electrode from extending off the flat face of the aluminum foil as well as solid electrolyte from being formed on the flat face, so that the anode and the cathode are positively separated.

Use of laser-beam machining or grinding with the optimized output can form the openings with ease. Before an insulating film is formed, a resist section is formed on the flat face of the aluminum foil at a given place, then a collector layer is formed before the resist film is removed. This method can form a number of openings at a time with ease.

A use of conductive adhesive in forming a connecting terminal achieves excellent productivity. Use of electro-plating or electroless-plating can form a number of connecting terminals at a time.

Use of a composition formed of conductive polymers including a conjugated polymer containing a pi-electron as a material for the solid electrolytic layer can form a solid electrolytic capacitor having a lower ESR and being more thermostable. Use of chemical polymerization or electrolytic polymerization realizes excellent productivity. Still other methods are available as follows: Suspension of powder of a conductive polymer is applied and dried, and then the conductive polymer is formed by electrolytic polymerization, so that stress applied to the dielectric coating can be reduced. Manganese nitrate is pyrolized (heat decomposition) to form manganese dioxide, so that solid electrolytic capacitors can be manufactured positively by an established technique. Manganese nitrate is pyrolized (heat decomposition) to form manganese dioxide, and then the conductive polymer is formed by electrolytic polymerization.

A collector is formed by use of a suspension of fine particles of carbon and by conductive adhesive, so that a solid electrolytic capacitor having a lower ESR than another solid electrolytic capacitor in which conductive adhesive is directly applied to solid electrolyte.

The solid electrolytic capacitor of the present invention and a method of manufacturing the same are demonstrated hereinafter with reference to the accompanying drawings.

Exemplary Embodiment 1

Figure 2:
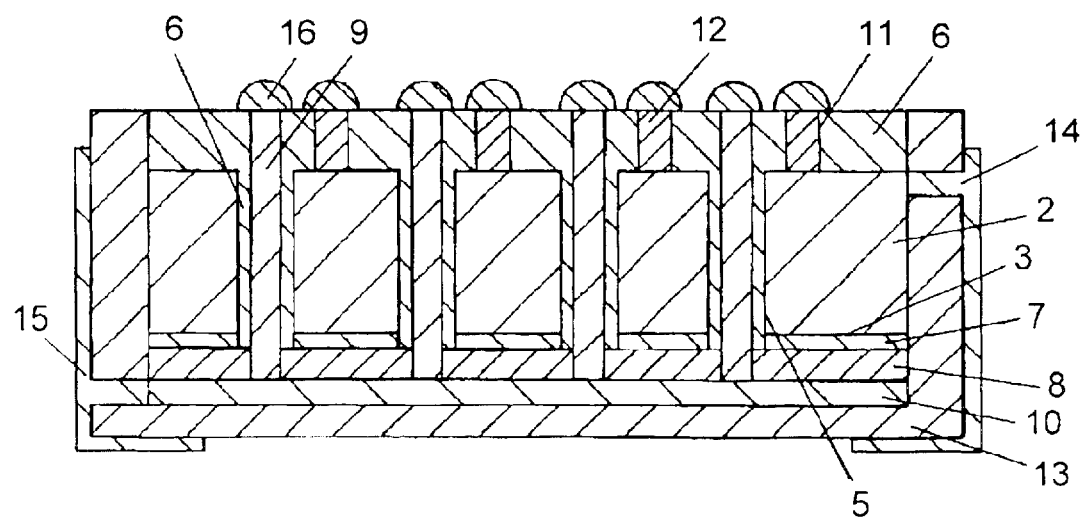
FIG. 2 shows a sectional view of a solid electrolytic capacitor of the present invention.
Figure 3:
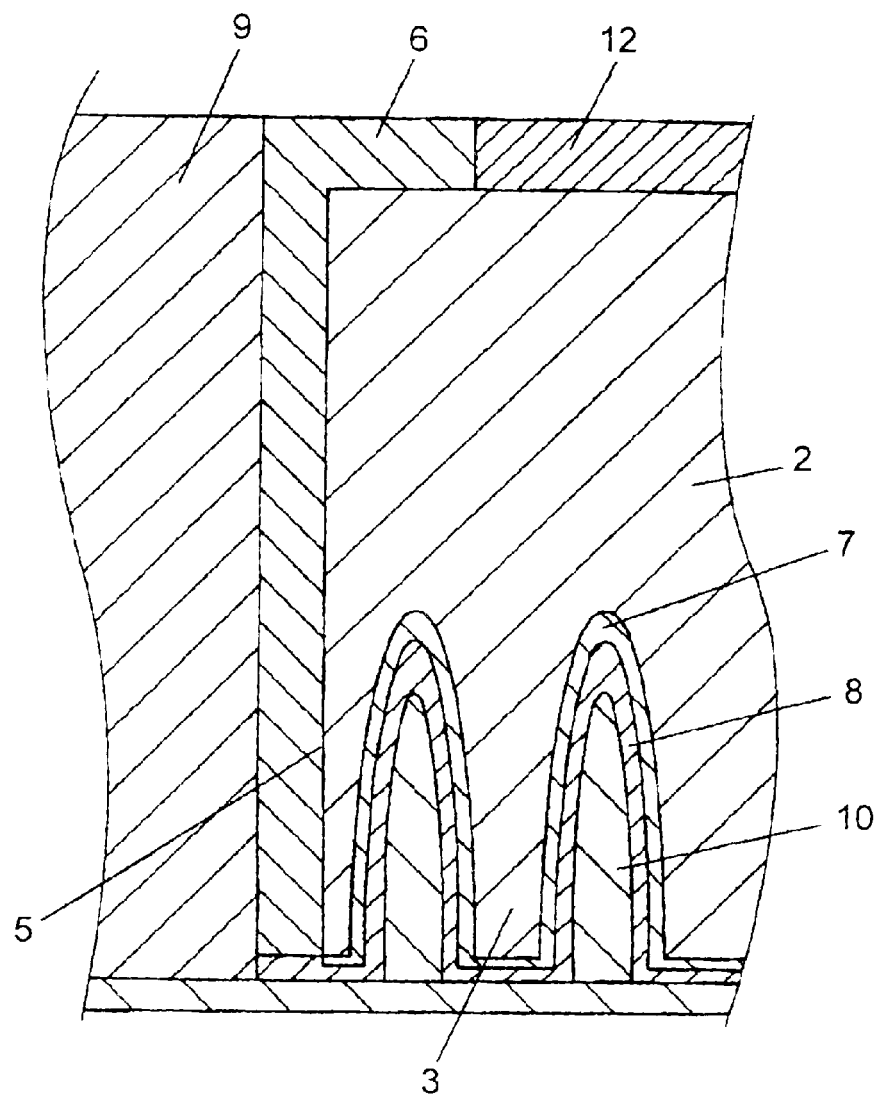
FIG. 3 shows an enlarged sectional view of an essential part of a solid electrolytic capacitor of the present invention.

The first exemplary embodiment is demonstrated with reference to FIG. 1 through FIG. 14. FIG. 1 shows a perspective view of a solid electrolytic capacitor in accordance with the first embodiment of the present invention. FIG. 2 shows a sectional view of the solid electrolytic capacitor. FIG. 3 shows an enlarged sectional view of an essential part of the solid electrolytic capacitor.

First, a structure of sheet-like capacitor element 1 of the present invention is described following its manufacturing steps. Etch one of the faces of aluminum foil 2 to form a porous section (hereinafter referred to as porous section 3), then form resist film 4 on the porous section. Next, form through-holes 5 in aluminum foil 2 at given places, then form insulating films 6 on the non-porous face (flat face) and on the inner walls of the through-holes. Remove resist film 4 and form dielectric coating 7 on porous section 3. Then form solid electrolytic layer 8 on dielectric coating 7 before through-hole electrodes 9 are formed in through-holes 5. Next, collector layer 10 is formed on solid electrolytic layer 8. Finally, form openings 11 on insulating film on the flat face at given places, and form connecting terminals 12 at exposed faces of openings 11 and through-hole electrodes 9.

Provide outer case 13 on the lateral faces and collector layer 10, and form first external terminal 14 and second external terminal 15, where terminal 14 is electrically coupled to aluminum foil 2 on outer case 13 and terminal 15 is electrically coupled to collector layer 10. Then form connecting bumps 16 both on through-hole electrodes 9 and connecting terminals 12, so that a solid electrolytic capacitor is built.

Figure 4:
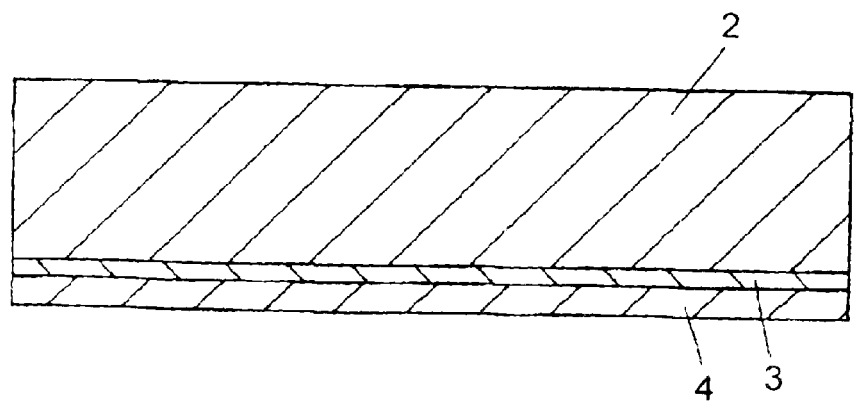
FIG. 4 shows a sectional view illustrating a status where a resist film is formed on a porous section of an aluminum foil of a solid electrolytic capacitor of the present invention.

A manufacturing method of the solid electrolytic capacitor of the present invention is detailed hereinafter with reference to FIGS. 4–14. As shown in FIG. 4, one of the faces of the aluminum foil 2 is etched and the one face becomes porous. Resist film 4 is formed on porous section 3. A suitable method of forming the resist film can be selected from immersion, spin-coating, and screen-printing. Photosensitive resin is applied to porous section 3 by one of the foregoing methods, and then the resin is dried, thereby obtaining resist film 4. Organic adhesive film can be used as resist film 4. In this case, resist film 4 is formed on porous section 3 by a film bonding method.

Figure 5:
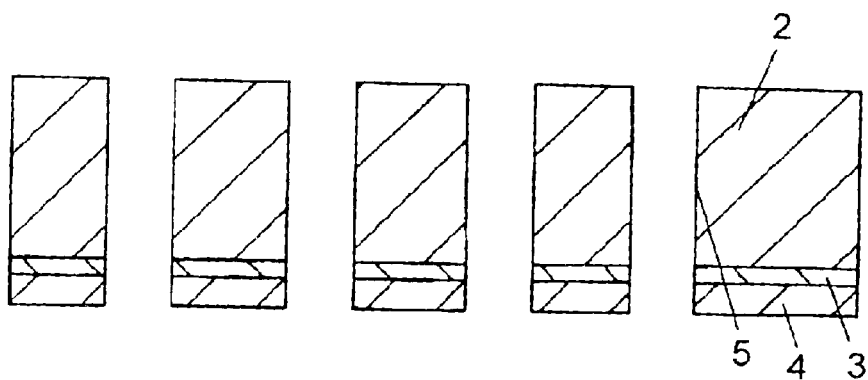
FIG. 5 shows a sectional view illustrating a status where through-holes are formed at given places on the aluminum foil of the solid electrolytic capacitor of the present invention.

Next, as shown in FIG. 5, through-holes 5 are formed on aluminum foil 2 at given places. A wet-etching method can form a number of through-holes 5 at a time. Laser-beam machining, punching, drilling or electric discharge machining is suitable to form through-holes 5 in any materials with accuracy, and can form through-holes 5 as fine as not more than 100 μm across.

In the case of using the wet-etching, first, form resist film having openings for through-holes on both the faces of aluminum foil 2, and then form holes by the wet-etching before the resist film is removed, thereby forming through-holes 5. Further, chamfer the edges of through-holes 5 on porous section 3 of aluminum foil 2 by the wet-etching, so that reliability of insulating film 6 later formed is increased.

Figure 6:
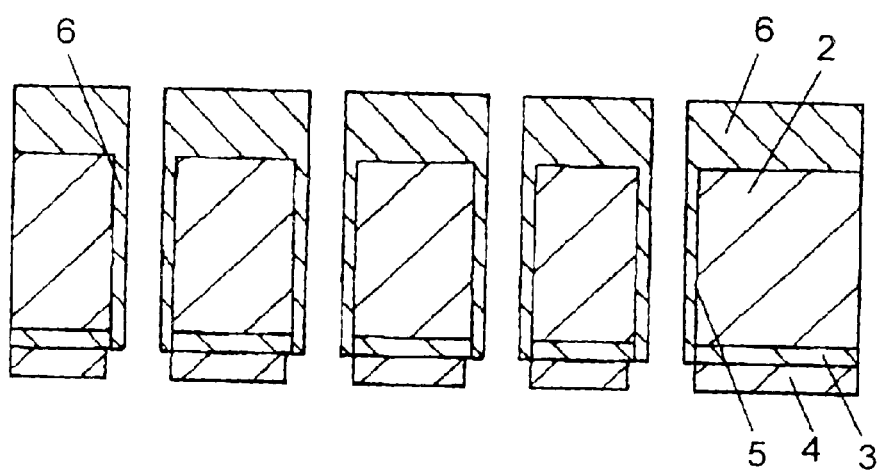
FIG. 6 shows a sectional view illustrating a status where insulating films are formed on a flat face (non-porous face) of the aluminum foil and on inner walls of the through-holes of the solid electrolytic capacitor of the present invention.

Next, as shown in FIG. 6, form an insulating coating by an electro-deposition method, so that insulating film 6 can be formed on the flat face of aluminum foil 2 as well as on the inner walls of through-holes 5. The electro-deposition method can form a fine and uniform film, so that insulating film 6 does not fill up entire hole 5, but covers only the inner wall.

There is some possibility that insulating film 6 is thinly formed at edges of through-holes 5 on the face where dielectric coating 7 is formed, chamfering the edges is effective to solve this problem and also increases insulation reliability. Further, insulating resin produced by mixing micro-gel, fine-particles of carbon and fine-particles of titanium oxide, those materials being suitable for covering edges, is electro-depositioned, thereby solving the problem more effectively.

The micro-gel discussed above is produced by adding polymeric particles having particle size of not more than 10 μm to a polymer, thereby increasing a viscosity of the polymer. The micro-gel is hard to flow and suitable for covering edges; however, in the case of providing electro-deposition on the inner wall of through-hole 5 as fine as less than 100 μm across, more careful processing is required because the mixed resin suitable for covering edges sometimes makes the electro-deposition layer thick enough for through-hole 5 to be filled up with the mixed resin. Thus the process of forming insulating film 6 by electro-desposition is split into two steps. First, provide thin resin of high resistivity as a first layer, then provide insulating resin formed by mixing micro-gel, fine particles of carbon and fine particles of titanium oxide, those materials suitable for covering edges, as a second layer. As a result, insulating film 6 of fewer insulation defects is formed on the inner wall of through-holes 5.

Figure 7:
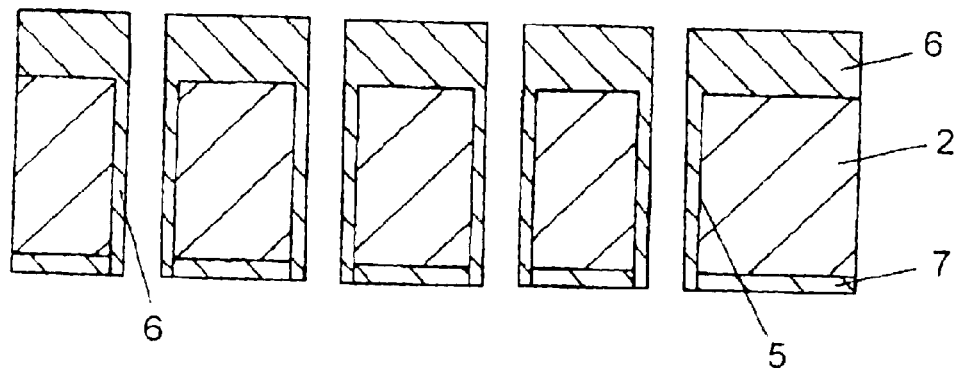
FIG. 7 shows a sectional view illustrating a status where a dielectric coating is formed on the porous section of the aluminum foil of the solid electrolytic capacitor of the present invention.
Figure 8:
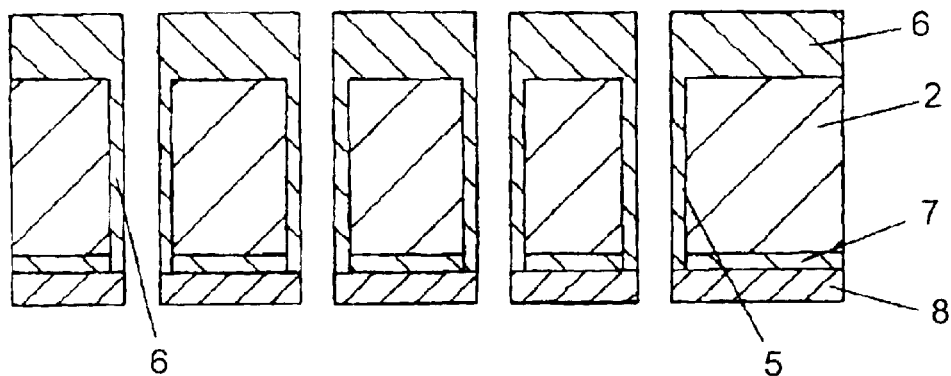
FIG. 8 shows a sectional view illustrating a status where a solid electrolytic layer is formed on the dielectric coating on the aluminum foil of the solid electrolytic capacitor of the present invention.

Next, as shown in FIG. 7, after resist film 4 is removed, anodizing in acidic solution allows forming dielectric coating 7 on porous section 3 of aluminum foil 2. Then as shown in FIG. 8, solid electrolytic layer 8 is formed on dielectric coating 7. This layer 8 is formed by forming a polymer layer using a conjugated polymer containing a pi-electron such as polypyrrole or polythiophene, and/or a composition including conductive polymers other than those discussed above through chemical or electrolytic polymerization. Solid electrolytic layer 8 can be formed by electrolytic polymerization or by only chemical polymerization after the conductive polymer is pre-coated by chemical polymerization. The conductive polymer can be formed by electrolytic polymerization after the suspension of powder of the conductive polymer is applied and dried, or manganese nitrate is impregnated before thermal decomposition, thereby forming manganese dioxide, and then the conductive polymer can be formed by electrolytic polymerization. There is another established technique to form solid electrolytic layer 8: Manganese nitrate is thermally decomposed to form manganese dioxide. This method can produce a fine electrolytic layer, and adjust a thickness of the layer arbitrarily, so that the productivity and reliability can be improved.

Figure 9:
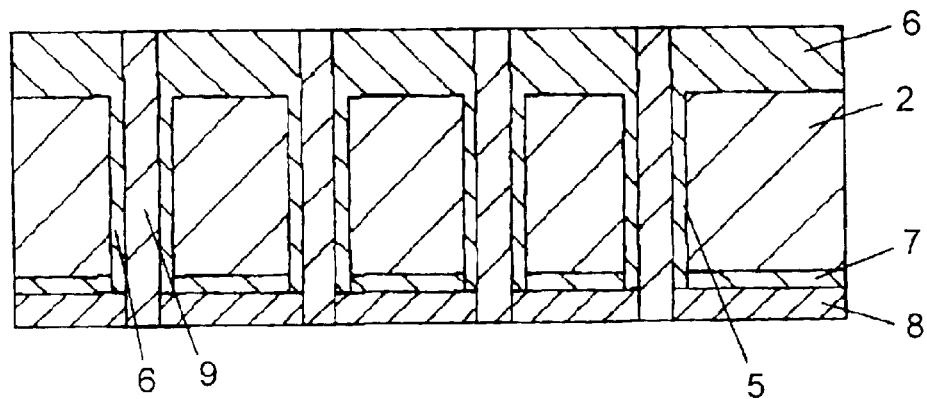
FIG. 9 shows a sectional view illustrating a status where through-hole electrodes are formed in the through-holes of the solid electrolytic capacitor of the present invention.

As shown in FIG. 9, the step of forming through-hole electrode 9 in through-hole 5 is described. As a material of electrode 9, conductive adhesive formed by mixing conductive particles such as Ag paste and Cu paste, is filled into through-hole 6, and then cured.

Figure 10:
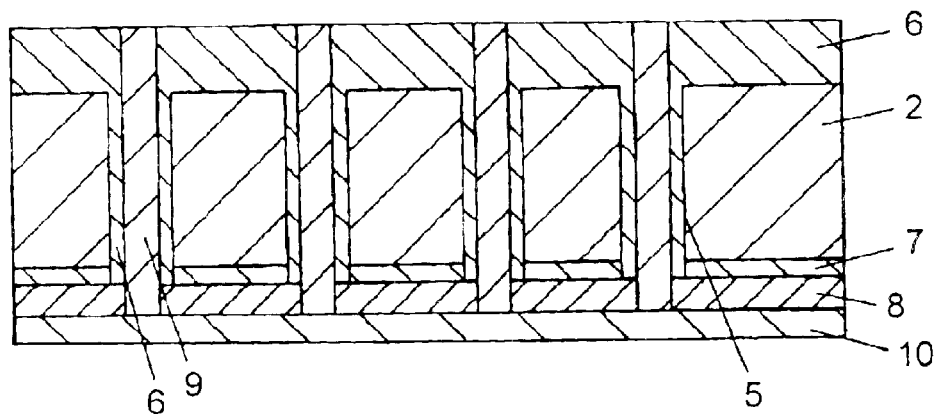
FIG. 10 is a sectional view illustrating a status where through-hole electrodes are formed in the through-holes of the solid electrolytic capacitor of the present invention.

As shown in FIG. 10, collector layer 10 is formed on solid electrolytic layer 8. Collector layer 10 is produced by laminating a carbon layer and a Ag-paste layer with conductive adhesive of which major components are a suspension of carbon fine-particles and a Ag-paste. This structure allows drawing electric-charges more efficiently.

Figure 11:
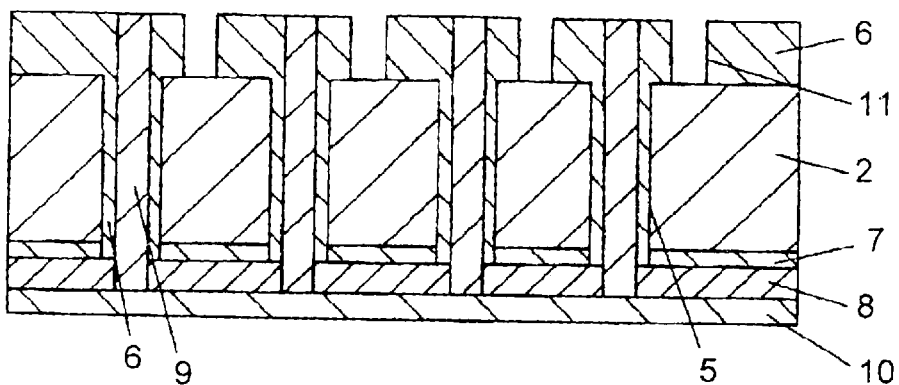
FIG. 11 is a sectional view illustrating a status where openings are formed on the insulating film of the solid electrolytic capacitor of the present invention.

As shown in FIG. 11, openings 11 are formed at given places on insulating film 6 prepared on the flat face of aluminum foil 2 with a YAG laser or a grinding method. Another method for forming openings 11 is, to form a resist section at first on a given place on the flat face of aluminum foil 2, then form collector layer 10 before the resist section is removed, and finally remove the resist on the given place.

Figure 12:
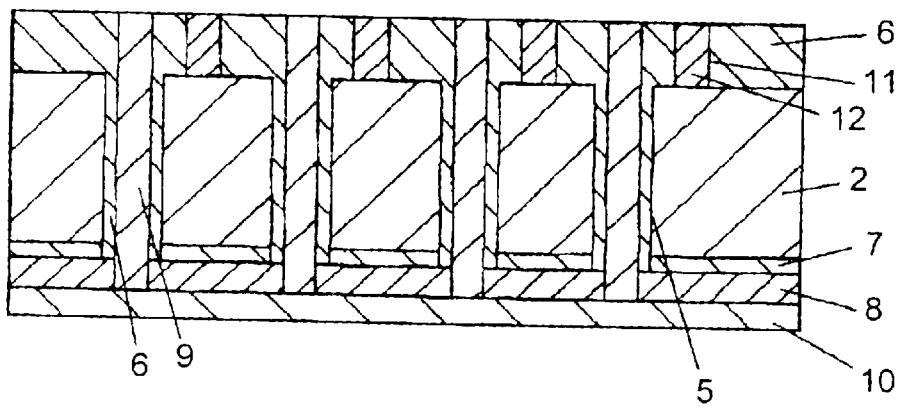
FIG. 12 is a sectional view illustrating a status where a connecting terminal is formed on the opening of the solid electrolytic capacitor of the present invention.

Next, as shown in FIG. 12, connecting terminal 12 is formed on the exposed face in opening 11 of insulating film 6 by using one of a conductive adhesive, electroplating or electroless-plating.

Figure 13:
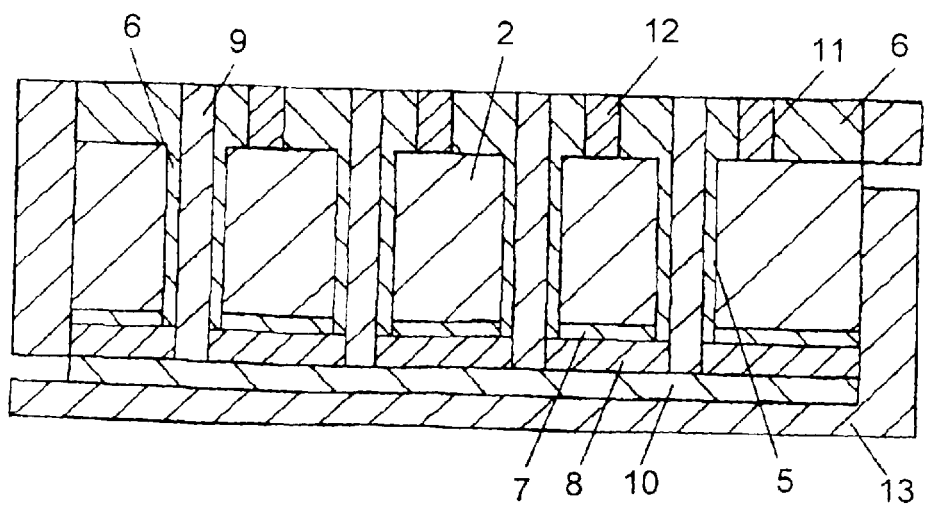
FIG. 13 is a sectional view illustrating a status where an outer case is provided to a capacitor element of a solid electrolytic capacitor of the present invention.
Figure 14:
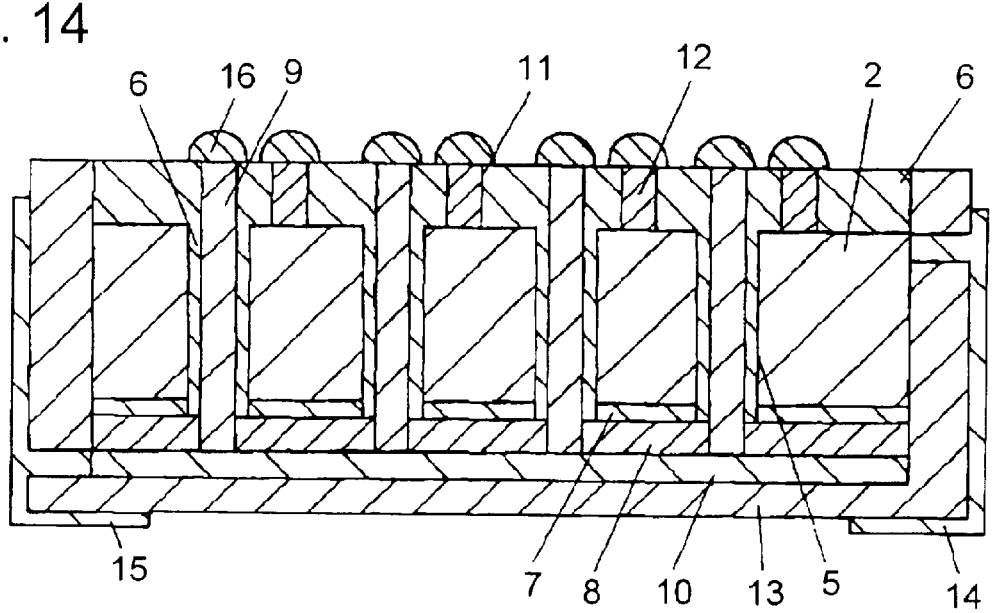
FIG. 14 is a sectional view illustrating a status where external terminals and connecting bumps are formed on the outer case of the solid electrolytic capacitor of the present invention.

Then as shown in FIG. 13, outer case 13 made from epoxy resin, good for electrical insulation and resistance to humidity, is formed around capacitor element 1 for protecting element 1 from external stress, thereby increasing the reliability. Next, as shown in FIG. 14, first external terminal 14 electrically coupled to aluminum foil 2, and second external terminal 15 electrically coupled to collector layer 10 are formed on outer case 13, so that capacitor element 1 is completed.

It is desirable to form connecting bumps 16 on connecting terminals 12 and through-hole electrodes 9 in order to increase the connecting reliability between the capacitor and semiconductor components or electronic components.

The method discussed above can readily produce the solid electrolytic capacitors that can be directly connected to semiconductor components and have a faster response to a high frequency.

Exemplary Embodiment 2

Figure 15:
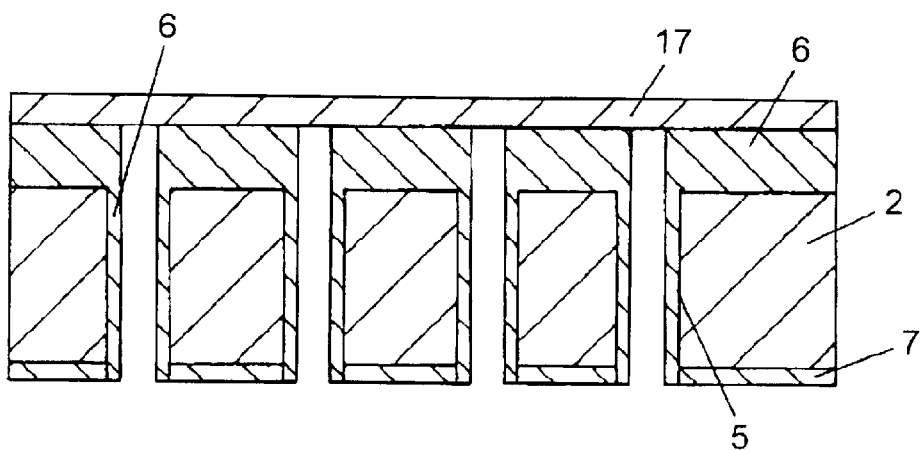
FIG. 15 is a sectional view illustrating a status where a resist film is formed on an insulating film of another solid electrolytic capacitor of the present invention.
Figure 16:
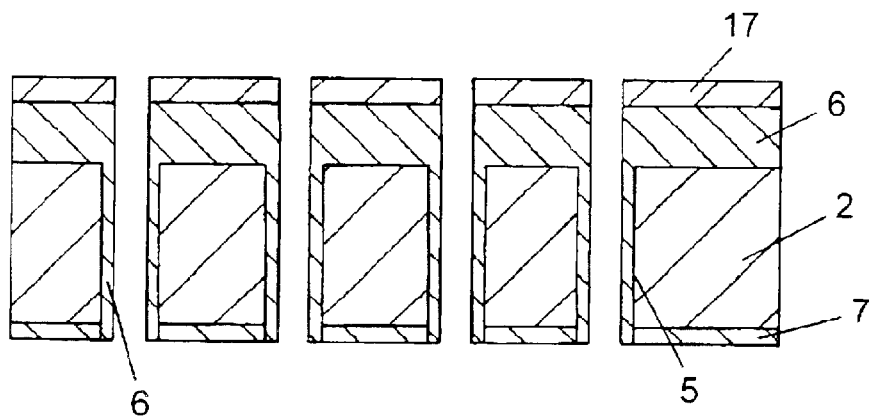
FIG. 16 is a sectional view illustrating a status where a pattern is provided to the resist film of the solid electrolytic capacitor shown in FIG. 15.

The second exemplary embodiment of the present invention is demonstrated hereinafter with reference to FIG. 15 and FIG. 16.

Etch one of the surfaces of aluminum foil 2 to form a porous section (hereinafter referred to as porous section 3), and then form resist film 4 on the porous section. Next, form through-holes 5 in aluminum foil 2 at given places, and then form insulating films 6 on the non-porous face (flat face) and on the inner walls of through-holes 5. Remove resist film 4 and form dielectric coating 7 on porous section 3. Those steps are the same as those in the first embodiment.

Then solid electrolytic layer 8 is formed on dielectric coating 7. At this time, when the through-hole is not less than 80 μm across, solid electrolytic layer 8 can be sometimes formed on insulating film 6 prepared on the flat face of aluminum foil 2. This problem can be overcome by the following methods: First, as shown in FIG. 15, photosensitive resin is applied on insulating film 6 by one of immersion, spin-coating, or screen-printing, then the photosensitive resin is cured for obtaining second resist film 17. Another way is this: adhesive organic film 6 can be used as second resist film 17. In this case, the organic film is formed on insulating film 6 by a film bonding method. Then as shown in FIG. 16, form holes on second resist film 17 in given dimensions at given places corresponding to through-holes 5 by a photo-process or a machining method.

Next, form solid electrolytic layer 8 and through-hole electrode 9 by the same methods as the first embodiment, and then remove second resist film 17, so that solid electrolytic layer 8 is not formed on the flat face of aluminum foil 2. As a result, an anode and a cathode can be positively separated.

Then, prepare collector layer 10 on solid electrolytic layer 8 by the same method as the first embodiment, and form openings 11 at given places on insulating film 6 prepared on the flat face of aluminum foil 2. Then form connecting terminals 12 on the exposed faces of opening 11 and through-hole electrodes 9.

As discussed above, the second exemplary embodiment provides a manufacturing method of the solid electrolytic capacitors, and the method can prevent solid electrolytic layer 8 from reaching to openings 11 later formed, so that the anode and the cathode are positively separated.

Exemplary Embodiment 3

Figure 17:
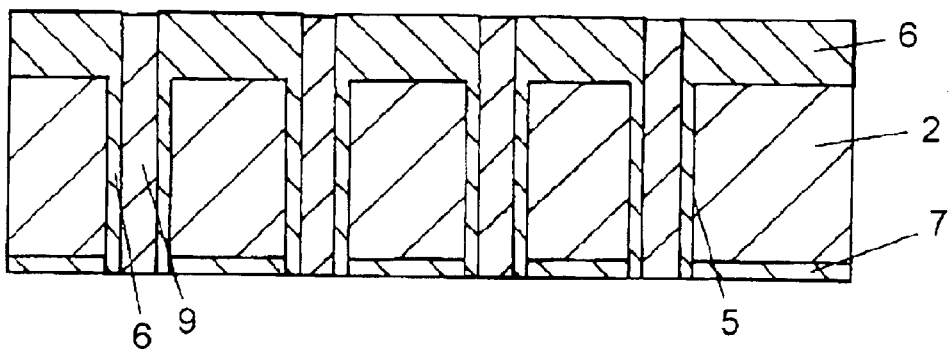
FIG. 17 is a sectional view illustrating a status where through-hole electrodes are formed in through-holes of still another solid electrolytic capacitor of the present invention.
Figure 18:
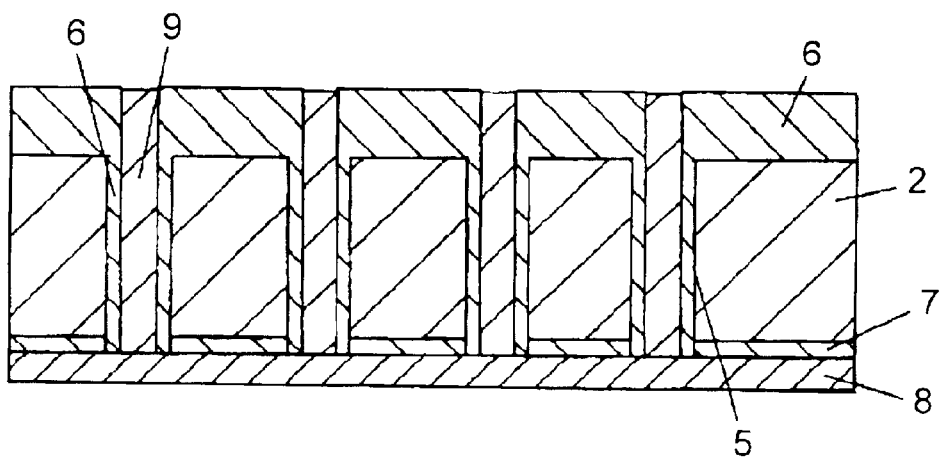
FIG. 18 is a sectional view illustrating a status where a solid electrolytic layer is formed on a dielectric coating on an aluminum foil of the still another solid electrolytic capacitor of the present invention.

The third exemplary embodiment of the present invention is demonstrated hereinafter with reference to FIG. 17 and FIG. 18, which illustrate major steps of a method of manufacturing the solid electrolytic capacitors in accordance with the third embodiment.

Etch one of the surfaces of aluminum foil 2 to form a porous section (hereinafter referred to as porous section 3), and then form resist film 4 on the porous section. Next, form through-holes 5 in aluminum foil 2 at given places, and then form insulating films 6 on the non-porous face (flat face) and on the inner walls of the through-holes. Remove resist film 4 and form dielectric coating 7 on porous section 3. Those steps are the same as those in the first embodiment.

Then solid electrolytic layer 8 is formed on dielectric coating 7. At this time, when the through-hole is not less than 80 μm across, solid electrolytic layer 8 can be sometimes formed on insulating film 6 prepared on the flat face of aluminum foil 2. This problem can be overcome by the following methods: As shown in FIG. 17, through-hole electrode 9 is formed in through-hole 5. As a material of electrode 9, conductive adhesive formed by mixing conductive particles such as Ag paste and Cu paste is filled into through-hole 5, and then cured. Then as shown in FIG. 18, solid electrolytic layer 8 is formed on dielectric coating 7, and collector layer 10 is formed on solid electrolytic layer 8. This method prevents solid electrolytic layer 8 from being formed on the flat face of aluminum foil 2.

Through-hole electrode 9 is prevented from extending off the flat face of aluminum foil 2 by the following method: After dielectric coating 7 is formed, second resist film 17 is formed on the entire face of insulating film 6. Next, through-hole electrode 9 is formed in through-hole 5, and solid electrolytic layer 8 is formed on dielectric coating 7, then collector layer 10 is formed on top of that. Finally, second resist film 17 is removed. This method prevents the solid electrolyte from being formed on the flat face of aluminum foil 2 as well as through-hole electrode 9 from extending off the flat face.

Openings 11 are formed at given places on insulating film 6 prepared on aluminum foil 2 by YAG laser. This is the same process as the first embodiment. Another method to form openings 11 is available: Before insulating film 6 is prepared, a resist section is formed in advance at a given place on the flat face of aluminum foil 2 using photo-curable resin. The resist section is removed after the collector layer is formed. Connecting terminals 12 are formed on exposed faces of openings 11 and through-hole electrodes 9.

As discussed above, the third exemplary embodiment provides a manufacturing method of the solid electrolytic capacitors, and the method can prevents solid electrolyte from infiltrating into openings 11 later formed, so that the anode and the cathode are positively separated.

Exemplary Embodiment 4

The fourth exemplary embodiment of the present invention is demonstrated specifically hereinafter with reference to FIG. 19 through FIG. 22, which illustrate major steps of a method of manufacturing the solid electrolytic capacitors in accordance with the fourth embodiment.

Etch one of the surfaces of aluminum foil 2 to form a porous section (hereinafter referred to as porous section 3), and then form resist film 4 on porous section 3. Next, form through-holes 5 in aluminum foil 2 at given places, and then form insulating films 6 on the non-porous face (flat face) and on the inner walls of the through-holes. Remove resist film 4 and form dielectric coating 7 on porous section 3. Those steps are the same as those in the first embodiment.

Figure 19:
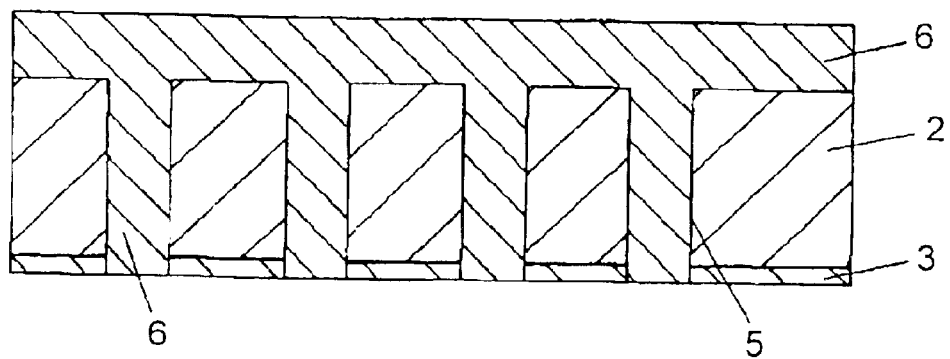
FIG. 19 is a sectional view illustrating a status where an insulating film is formed on a flat face of an aluminum foil and in through-holes of yet another solid electrolytic capacitor of the present invention.
Figure 20:
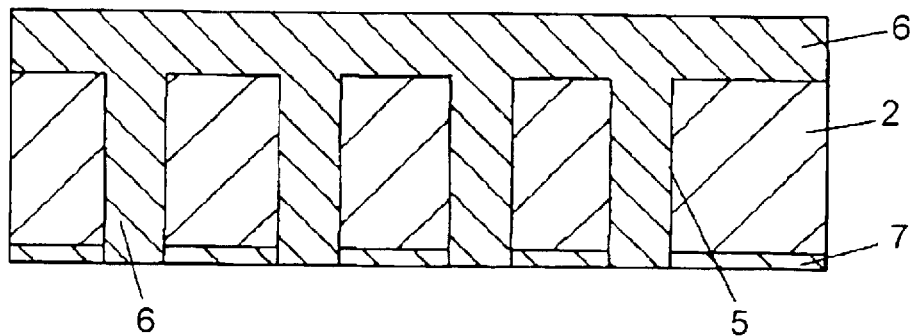
FIG. 20 is a sectional view illustrating a status where a dielectric coating is formed on a porous section of an aluminum foil of the solid electrolytic capacitor shown in FIG. 19.
Figure 21:
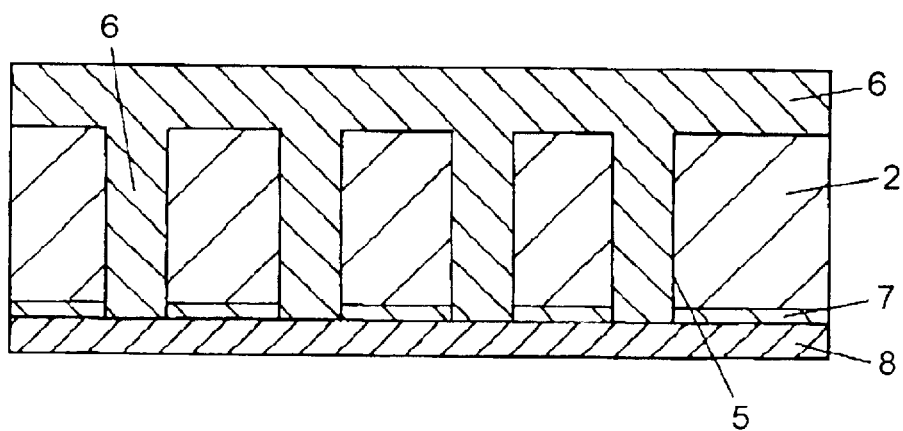
FIG. 21 is a sectional view illustrating a status where a solid electrolytic layer is formed on the dielectric coating on the aluminum foil of the solid electrolytic capacitor shown in FIG. 20.
Figure 22:
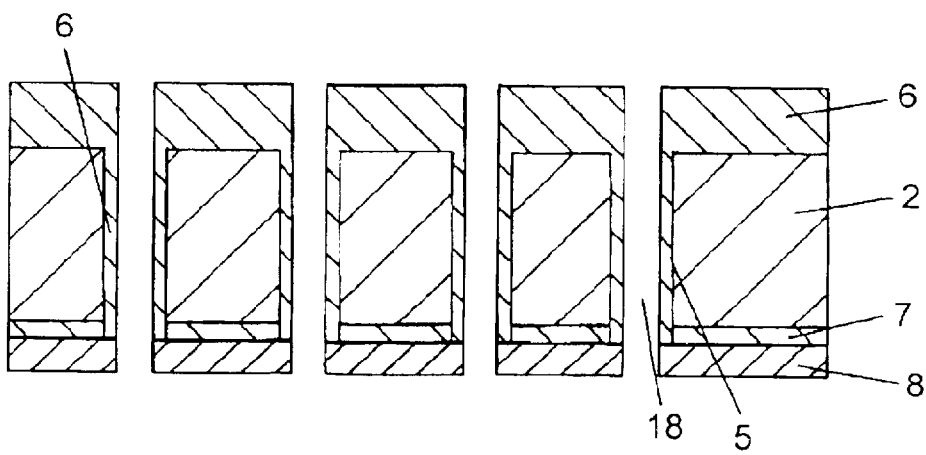
FIG. 22 is a sectional view illustrating a status where second through-holes are formed in the insulating film of the solid electrolytic capacitor shown in FIG. 21.

Then solid electrolytic layer 8 is formed on dielectric coating 7. At this time, when the through-hole is not less than 80 μm across, solid electrolytic layer 8 can be sometimes formed on insulating film 6 prepared on the flat face of aluminum foil 2. This problem can be overcome by the following methods: As shown in FIG. 19, insulating film 6 is formed such that the flat face of aluminum foil 2 is entirely covered and first through-hole 5 is completely filled up with film 6. In order to fill up through-hole 5 completely, insulating film 6 can be formed by repeating electro-deposition of insulating resin several times, or using screen printing or potting of the insulating resin. Next, as shown in FIG. 20, dielectric coating 7 is formed on porous section 3, and then as shown in FIG. 22, second through-holes 18 are formed in insulating film 6. This structure prevents solid electrolytic layer 8 from being formed on the flat face of aluminum foil 2.

Steps following the processes discussed above are the same as the first embodiment. To be specific, after through-hole electrodes 9 are formed in second through-holes 18, collector layer 10 is prepared on solid electrolytic layer 8, and openings 11 are formed at given places on insulating film 6 prepared on aluminum foil 2. Then connecting terminals 12 are formed on exposed faces of opening 11 and through-hole electrodes 9.

As discussed above, the fourth exemplary embodiment provides a manufacturing method of the solid electrolytic capacitors. The method can increase insulation reliability between through-hole electrodes 9 and aluminum foil 2, and prevent solid electrolyte from reaching to openings 11 later formed, so that the anode and the cathode are positively separated.

Industrial Applicability

The manufacturing method disclosed in the present invention can readily manufacture the solid electrolytic capacitors that can be connected directly to semiconductor components and have a faster response to a high frequency as well as a large capacitance.

What is claimed is:

1. A method of manufacturing a solid electrolytic capacitor, the method including:
 a dielectric forming stage where a dielectric coating is formed on a porous surface of a valve metal sheet,
 an element forming stage where a solid electrolytic layer and a collector layer are formed on the dielectric coating, and
 a terminal forming stage where a connecting terminal to an external electrode is formed,
 wherein the dielectric forming stage comprises steps in the order of:
  (A1) etching a first face of the valve metal sheet for producing a porous section;
  (A2) forming a first resist film on the first face having the porous section;
  (A3) forming a through-hole on the first face at a given place;
  (A4) forming an insulating film on a second face of the valve metal sheet and on inner wall of the through-hole; and
  (A5) forming a dielectric coating after the first resist film is removed,
 wherein the element forming stage comprises the steps of:
  (B1) forming a solid electrolytic layer on the dielectric coating;
  (B2) forming a through-hole electrode in the through-hole; and
  (B3) forming a collector layer on the solid electrolytic layer;
 wherein the terminal forming stage comprises the steps of:
  (C1) forming an opening at a given place on the insulating film formed on the second face of the valve metal sheet; and
  (C2) forming a connecting terminal on exposed faces of the opening and the through-hole electrode.

2. The method of manufacturing the solid electrolytic capacitor of claim 1, wherein the element forming stage comprises the steps in the order of (B1), (B2) and (B3).

3. The method of manufacturing the solid electrolytic capacitor of claim 2, wherein the element forming stage further comprises the steps of:
 forming a second resist film on the insulating film before step (B1); and
 removing the second resist film following step (B1).

4. The method of manufacturing the solid electrolytic capacitor of claim 1, wherein the element forming stage comprises the steps in the order of (B2), (B1) and (B3).

5. The method of manufacturing the solid electrolytic capacitor of claim 1, wherein the element forming stage further comprises the steps of:
 (B4) forming a second resist film on the insulating film before step (B2), and
 (B5) removing the second resist film, wherein the element forming stage comprises the steps in the order of (B4), (B2), (B1), (B3) and (B5).

6. The method of manufacturing the solid electrolytic capacitor of claim 1, wherein the dielectric forming stage includes the step of forming a third resist film on the second face simultaneously with step (A2),
 wherein the element forming stage comprises the steps in the order of (B1), (B2) and (B3), and
 wherein the terminal forming stage includes the steps of:
  removing the third resist film; and
  forming an opening at a given place on the second face.

7. The method of manufacturing the solid electrolytic capacitor of claim 1, wherein the dielectric forming stage includes the step of forming a third resist film on the second face simultaneously with step (A2),
 wherein the element forming stage comprises the steps in the order of (B2), (B1) and (B3), and
 wherein the terminal forming stage includes the steps of:
  removing the third resist film; and
  forming an opening at a given place on the second face.

8. The method of manufacturing the solid electrolytic capacitor of claim 1, wherein the dielectric forming stage includes the step of forming the insulating film such that the second face of the valve metal sheet is covered and the through-hole is filled up with the insulating film,
 wherein the element forming stage comprises the steps in the order of step (B1); the step of forming a second through-hole in the through-hole filled up with the insulating film; the step of forming the through-hole electrode in the second through-hole; and step (B3).

9. The method of manufacturing the solid electrolytic capacitor of claim 1, wherein one of photosensitive resin and adhesive photosensitive film is used as the resist film.

10. The method of manufacturing the solid electrolytic capacitor of claim 1, wherein the resist film is formed by a method selected from the group consisting of immersion, spin coating, screen printing, and film laminating.

11. The method of manufacturing the solid electrolytic capacitor of claim 1, wherein step (A3) includes applying photoresist on both the faces of the porous valve metal sheet, and wet-etching a patterned opening.

12. The method of manufacturing the solid electrolytic capacitor of claim 1, wherein step (A3) is carried out by a method selected from the group consisting of laser-beam machining, punching, drilling, and electric-discharge machining.

13. The method of manufacturing the solid electrolytic capacitor of claim 1, wherein step (A3) further includes chamfering edges of the through-hole formed on the first face.

14. The method of manufacturing the solid electrolytic capacitor of claim 1, wherein step (A4) uses an electro-deposition method to form the insulating film.

15. The method of manufacturing the solid electrolytic capacitor of claim 14, wherein step (A4) includes forming insulating resin as a first layer; and forming insulating resin as a second layer by mixing micro-gel, fine carbon particles and fine particles of titanium oxide.

16. The method of manufacturing the solid electrolytic capacitor of claim 1, wherein step (B2) uses conductive adhesive to form the electrode.

17. The method of manufacturing the solid electrolytic capacitor of claim 1, wherein step (C1) is carried out by one of laser-beam machining and grinding.

18. The method of manufacturing the solid electrolytic capacitor of claim 1, wherein step (C2) uses conductive adhesive to form the terminal.

19. The method of manufacturing the solid electrolytic capacitor of claim 1, wherein step (C2) is carried out by at least one of electro-plating and electroless plating.

20. The method of manufacturing the solid electrolytic capacitor of claim 1, wherein step (B1) uses a composition including a conductive polymer to form the solid electrolytic layer.

21. The method of manufacturing the solid electrolytic capacitor of claim 20, wherein the conductive polymer is a conjugated polymer containing a pi-electron.

22. The method of manufacturing the solid electrolytic capacitor of claim 1, wherein step (B1) uses at least one of a chemical polymerization method and an electrolytic polymerization method.

23. The method of manufacturing the solid electrolytic capacitor of claim 1, wherein step (B1) includes forming a polymer film using suspension of powder of the conductive polymer, and providing electrolytic polymerization on the polymer film.

24. The method of manufacturing the solid electrolytic capacitor of claim 1, wherein step (B1) includes forming the solid electrolytic layer comprising manganese dioxide by thermally decomposing manganese nitrate.

25. The method of manufacturing the solid electrolytic capacitor of claim 24, wherein step (B1) includes forming conductive polymer by electrolytic polymerization following the process of forming the manganese dioxide.

26. The method of manufacturing the solid electrolytic capacitor of claim 1, wherein step (B3) uses suspension of fine carbon particles, and conductive adhesive to form the collector layer.

* * * * *